April 23, 1935.  A. D. DU BOIS  1,998,711
METHOD AND MEANS FOR MEASURING AND RECORDING
INTERVAL DEMAND FOR APPARENT POWER
Filed Sept. 22, 1930
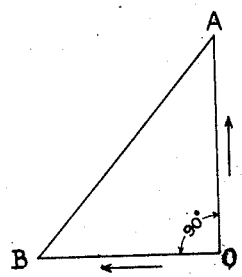
Fig. 1
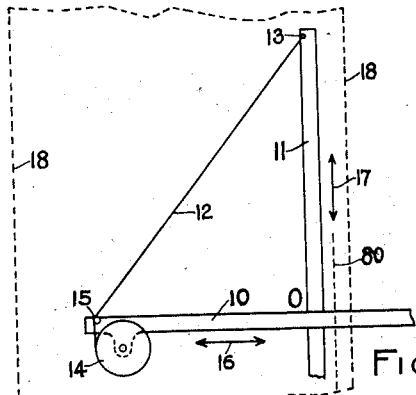
Fig. 2
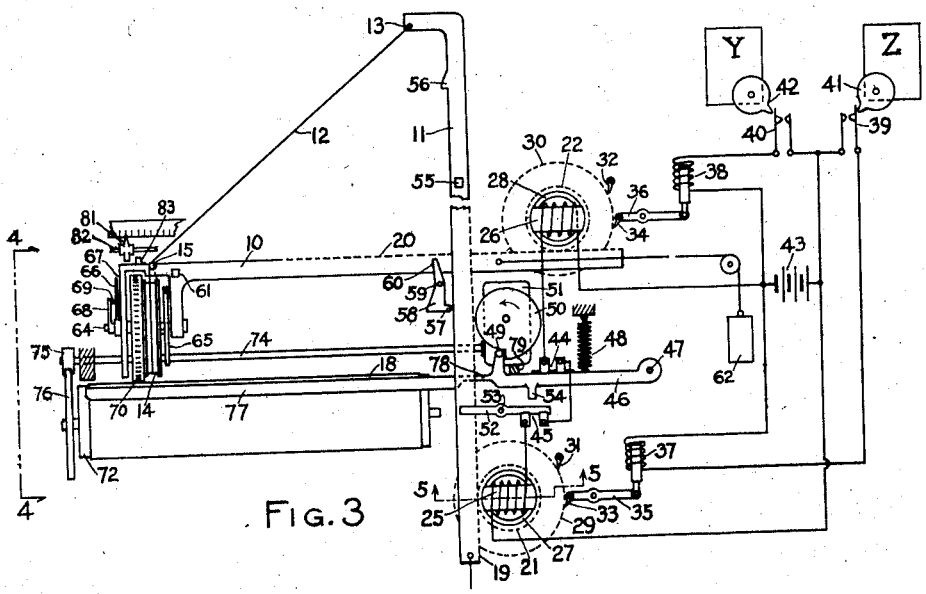
Fig. 3
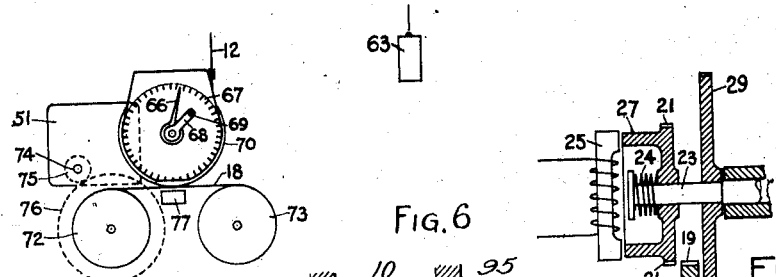
Fig. 6
Fig. 4
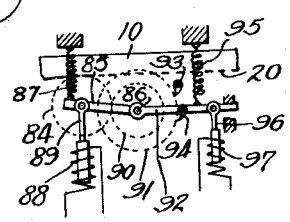
Fig. 5
Inventor
Alexander Dawes Du Bois Patented Apr. 23, 1935

1,998,711

UNITED STATES PATENT OFFICE 1,998,711

METHOD AND MEANS FOR MEASURING AND RECORDING INTERVAL DEMAND FOR APPARENT POWER

Alexander Dawes Du Bois, Excelsior, Minn.

Application September 22, 1930, Serial No. 483,591

18 Claims. (Cl. 234—5.5)

This invention relates to measurements in alternating-current electric circuits; and more particularly to measurements in power circuits or systems in which the current may be out of phase with the pressure. The present invention is a continuation in part of the invention set forth in my application, Serial No. 205,598, filed July 14, 1927.

A primary object of the invention is to provide an improved and simplified method of determining the apparent-power demand (commonly referred to as the kilovolt-ampere demand) of a user of electric power. In practice it is very desirable to measure and record the apparent-power demand, as this is one of the important factors of the cost of generating and supplying electric power.

Further objects of the invention are:—to provide method and means for measuring and printing on a record sheet the separate, successive interval demands for apparent power (kv.-a.) during any number of time intervals; to provide method and means for printing in the same record the successive effective-power demands (kw.) for the same time intervals; to provide method and means for registering the maximum of all the interval demands for apparent power occurring within a total billing period; to provide method and means for registering the maximum of all interval demands for effective power occurring within the total billing period; to provide improved means for automatically forwarding and retracting a pair of traversing members in response to energy meters and a timing mechanism; to provide means for insuring complete retraction of both traversing members; to provide improved means for quickly disengaging the traversing members from their propelling devices in response to timing means, and for quickly engaging them in response to the retracted traversing members; and to provide other improvements accessory to these objects as herein set forth. The invention provides for retention of the usual functions of two standard meters employed in the method, whereby to register total effective energy (kw.-hrs.) and total reactive energy (react.-kv.-a.-hrs.) used during a billing period. Moreover the power-factor for each successive time interval can be easily derived from the recorded interval demands for apparent power and effective power.

I accomplish these objects as hereinafter described, and illustrated in the accompanying drawing to which reference is hereby made, and in which:—

Fig. 1 is a diagram illustrating the geometrical relations employed in my invention, and showing the relative paths of travel of two traversing elements;

Fig. 2 is a diagram of typical means for performing the method;

Fig. 3 is a diagrammatic representation of a complete automatic apparatus;

Fig. 4 is an end elevation of certain parts of the mechanism as viewed from line 4, 4, of Fig. 3;

Fig. 5 is an enlarged diagrammatic detail partly in section on the line 5, 5, of Fig. 3; and Fig. 6 is a diagrammatic detail showing an alternative form of traversing gear and means for disengagement.

Similar reference letters and numerals refer to similar parts throughout the several views.

It is known, to persons skilled in the art to which this invention appertains, that the apparent-energy delivered in a given time is the geometric sum of the effective energy and reactive energy. That is, referring to the right-angled triangle of Fig. 1, if the length OB is drawn to represent effective energy, and the length OA is drawn to represent reactive energy, the total apparent energy will be represented by the length of the hypotenuse AB, which is the geometric sum of OA and OB.

If, then, a traversing element be moved from point O toward point A with a velocity proportional to the reactive power in the circuit under consideration, the distance OA traveled by the element in a given time will be a measure of the reactive energy for that time. Likewise, if a second traversing element be simultaneously moved from O toward B, with a velocity proportional to the effective power in the circuit, the distance OB traveled by this element, in the same time interval, will be a measure of the effective energy for the time interval. Hence the length AB of the hypotenuse of the right triangle formed in the manner described, is a measure of the total apparent energy for the predetermined time interval. This quantity when divided by the time of the interval gives the apparent rate of flow of energy, which is apparent power. If the measuring scale, applied to the hypotenuse, is appropriately calibrated with reference to the time interval, the measurement of AB will directly show the mean apparent power for the interval. This quantity will be referred to as the "interval demand". It will be commonly measured in volt-amperes of in kilovolt-amperes. The angle ABO, between hypotenuse and base of the triangle of energy, is the mean angle of phase displacement between pressure and current in the circuit; hence the cosine of this angle is the mean power-factor of the load during the time interval represented by the triangle.

My method of utilizing these known principles and geometric relations will be readily understood by referring to Fig. 2. I employ a flexible measuring element, 12, wound upon a rotatable circular carrier, 14. The circular carrier is rotatively mounted on one traversing element, 10. The free end of the flexible measuring element is attached to the other traversing element, 11.

The method, briefly stated, is as follows: One end of a flexible measuring element is moved in a straight line, in a given direction (such as OA), with a velocity at each moment proportional to the reactive power. Simultaneously, a circular carrier having the flexible measuring element wound about its periphery is moved from the same starting point in a straight line (such as OB), at right angles to the first, with a velocity at each moment proportional to the effective power. At the expiration of a predetermined interval of time, the two traversing motions aforesaid are stopped; the amount of rotation of the circular carrier, due to the withdrawal of the flexible element, is recorded; the extent of traverse of the carrier is also recorded; and the carrier and free end of the flexible measuring element are quickly returned to the starting point (O in Fig. 1). These operations are repeated for each succeeding time interval, so long as the records of interval demand are desired.

It will be observed that the degree of rotation of the circular carrier is proportional to the separation of the stopping points (A and B of Fig. 1) and is therefore a measure of the apparent energy delivered during the time interval. The extent of traverse of the carrier is a measure of the effective energy for the time interval. During the return of the elements to zero position, the circular carrier is reversely rotated, to rewind the flexible element completely thereon.

As indicated in Fig. 2, the following features are comprised in a suitable means for performing this method mechanically:—a first slider or traversing element 10 movable in the directions indicated by arrows 16 in response to an effective-energy meter; a second slider or traversing element 11 movable in the directions indicated by arrows 17 in response to a reactive-energy meter (connected to measure wattless component); a circular carrier or drum 14 rotatively mounted on slider 10; a small guide pulley 15 mounted on slider 10; and a flexible measuring element 12, wound upon the drum 14, passing over the guide 15, and having its free end attached to the slider 11 at the point 13. The flexible measuring element may consist of a thread, or a thin metal tape, or may be of any other suitable form. The drum 14 is provided with a spring or other means to keep the measuring element sufficiently taut and to rewind it during the retractive movements of the traversing elements. At the beginning of each time interval, the points 13 and 15 on the respective sliders are both at the point of origin, O. The angular motions of the drum may be transmitted to a non-return pointer of any suitable construction, so that the position of the pointer will show the largest angle passed over by the drum in any one of the successive time intervals. Thus the pointer registers the maximum interval demand in volt-amperes. Similarly, the rectilinear motions of the traversing element 10 may be transmitted to another non-return pointer, which will show the greatest traverse of the element 10 in any one of the successive intervals; thereby registering the maximum interval-demand in watts.

When it is desired to record the effects of leading as well as lagging currents, the traversing element for measuring the reactive component will be arranged to move in one direction for lagging currents and in the opposite direction for leading currents.

Should it be desired to sum up the apparent energy delivered during an entire billing period, this can be done by mounting, upon the traversing member 10, a standard registering train of gears of small dimensions; and operatively connecting the first gear of the train to the shaft 64 through a one-way clutch.

In practice, the sliders 10 and 11 are under the control of a clock mechanism, being thereby automatically returned to their zero positions at the close of each time interval. For example, if the time interval is to be fifteen minutes, the clock mechanism will be adjusted to return both sliders to zero four times per hour.

When it is desired to record each separate interval demand, with its time of occurrence, a movable paper chart is added to the clock mechanism. In Fig. 2, the edges of such a chart are diagrammatically indicated by the broken lines 18; the travel of the chart being in either of the directions indicated by the arrows 17. At the close of each time interval, before the sliders return to zero, a printing wheel in connection with drum 14 is caused to strike the paper and thereby to print a number or character representing the apparent-power demand (volt-amperes). The distance of this impression from a zero line 80 on the chart is a measure of the effective-power demand (watts). By this means the mechanism makes a record of both the kv.-a. demand and the kw. demand in one operation for each successive time interval. A suitable time scale on the chart shows the time of day at which each demand occurred.

The invention is not limited to any particular kind or form of energy meters. It is intended to be used either with single-phase meters or polyphase meters of standard construction.

An apparatus for automatically performing all the functions previously mentioned is shown diagrammatically in Figs. 3, 4 and 5. In general, it is immaterial whether the axis of the circular carrier 14 is at right angles to the line of traverse, as in Fig. 2, or parallel to it, as in Fig. 3.

The traversing member 11 has a rack 19 meshing with a pinion 21 which is slidably mounted on a splined shaft, or a square shaft, 23 (Fig. 5). The pinion is normally in engagement with the rack 19, being held in engagement by a spring 24. A stationary electro-magnet 25, when energized, acts upon an annular iron flange 27 of the pinion 21, to slide the pinion outwardly on shaft 23, against the restraining pressure of the spring 24, until the pinion 21 and rack 19 are disengaged. Fig. 5 shows the positions of the parts when the magnet 25 is energized.

Rigidly mounted on shaft 23, is a ratchet wheel 29 which engages with a restraining pawl 31, mounted on a stationary support, and also with an actuating pawl 33 mounted on a lever 35. The lever 35 is operated by an electro-magnet 37, which is in circuit with a contact maker 39 and a source of electromotive force 43. The contact 39 is momentarily closed at each revolution of a rotating member 41 of the reactive-energy meter Z, thus energizing the magnet 37, advancing the ratchet wheel 29 one notch, and thereby advancing the traversing member 11 by a definite, small amount.

The other traversing member, 10, is geared to a second traversing mechanism, 22, 26, 28, 30, 32, 34, 36, which is of the same construction and is similar in operation to the first traversing mechanism above described. The second traversing mechanism is operated by electro-magnet 38, which is in circuit with a contact maker 40 and source of electromotive force 43. The contact maker 40 is momentarily closed at each revolution of a rotating member 42 of the effective-energy meter Y, thus advancing the ratchet wheel 30 one notch, and advancing the member 10 by a definite small amount.

If preferred, the traversing pinion may be disengaged from the rack by pulling it radially out of mesh (as in Fig. 6) instead of sliding it axially (as in Fig. 5). Referring to Fig. 6, the ratchet wheel 91 is propelled by a lever 92 and pawl 94, operated by a plunger electro-magnet 97 which takes the place of magnet 38 in Fig. 3. The ratchet wheel 91 is rigidly attached to a gear wheel 90, coaxial with 91, on a common shaft 86 having stationary bearings. A tilting frame 85, fulcrumed on the axis 86, carries a gear or pinion 84 meshing permanently with gear 90. The pinion 84 is normally held in engagement with rack 20 on the traversing member 10 by means of a spring 87. But a plunger magnet 88, which takes the place of magnet 26 in the circuit shown in Fig. 3, serves to tilt the frame 85, in opposition to spring 87, thereby disengaging the pinion 84 from the rack 20 whenever the magnet 88 is energized. Obviously a similar mechanism is applicable to the traversing member 11, for which purpose the pinion 84 replaces pinion 21, magnet 97 replaces 37, and magnet 88 replaces 25 in Fig. 3.

The magnets 25 and 26 are connected electrically in series with a first contact maker 44, a second contact maker 45, and a source of electromotive force 43. The contact device 44 may be of any suitable form adapted to be closed by a movable element 46 under control of a clock or constant-speed motor 51. As shown in Fig. 3, the movable element may be a lever 46 fulcrumed at 47, and having an operating spring 48. The lever 46 carries a roller 49 which presses against a cam wheel 50 under the action of the spring 48. The cam wheel 50 is rotated by the timing mechanism 51 at a rate such as to close the contact maker 44 at the expiration of each predetermined time interval.

The contact device 45 is operated by an auxiliary lever 52 fulcrumed at 53. A lug or arm 54 on the lever 46 is adapted to engage the lever 52 near its right-hand end, whereby to close the contact device 45. Another lug 55, on the traversing member 11, is adapted to engage the lever 52 near its left-hand end, whereby to open the contact device 45.

The traversing member 11 has a projection 56 adapted to engage a catch element 57 on a dog 58 when near the limit of its retractive movement. The dog 58 is pivoted at 59 and hangs normally with its catch element adjacent to the surface of the slider 11; but it is provided with a trigger element 60 adapted to be engaged by a projection 61 on the traversing member 10, when the latter reaches the limit of its retractive travel. The traversing members 10 and 11 are provided with counter-weights 62 and 63 of suitable proportions to cause the return of the traversing members, by gravity, to their zero positions.

The operation of the traversing and restoring mechanism is as follows: At the beginning of a time interval, the lever 46 is in its uppermost position, and the contact device 44 is closed. Both traversing members are then at zero position. The lug 55 is in engagement with lever 52; and contact device 45 is open. Therefore the magnets 25, 26, are on open circuit, and the pinions 21, 22, are engaged with the racks 19, 20. As time proceeds, the traversing members 10, 11, are moved forward by the pinions, being driven by the ratchet wheels 29, 30, in response to the meters Z, Y, as previously explained. Meanwhile the cam wheel 50 is being rotated by the timing mechanism, thus moving the roller 49 away from the cam center, depressing the lever 46, against the force of the spring 48, and thereby opening the electrical contact 44. After 44 has opened, the arm 54 presses upon the switch lever 52, and continues to move its right hand end downward, thus closing contact 45. The magnets 25, 26, remain on open circuit because 44 was opened before 45 was closed.

At the termination of the time interval, as determined by the timing mechanism 51, the cam wheel 50, having made a complete revolution, releases the lever 46, which is then suddenly operated by the spring 48 to close the contact 44 and release lever 52 from engagement with arm 54. Contact 45 remains closed; and the closing of 44 therefore energizes the magnets 25, 26. The magnets, thus energized, immediately withdraw the pinions 21, 22, from engagement with the racks 19, 20; whereupon the traversing members, thus freed, return quickly toward their zero positions by the force of gravity acting through counter-weights 63, 62. Usually the two traversing members will not reach zero position at exactly the same instant. If member 10 is first to complete its retractive movement, its projecting finger 61 strikes trigger 60, thus moving the catch 57 away from member 11, so that the projection 56 is free to pass the catch, and the member 11 completes its retractive movement without interruption. On the other hand, if member 11 is first, its projection 56 engages with the catch 57 and its motion is thereby momentarily arrested, just short of its zero position. When member 10 reaches zero position, its projection 61 strikes and rests against trigger 60, thereby permitting member 11 to complete its stroke. The lug 55 on member 11 engages the end of lever 52 at the moment that the projection 56 passes beyond the catch 57. The remainder of the stroke of the member 11 is just sufficient to operate the lever 52, and thereby to open the electrical contact 45. The lever 52 remains in either its up or down position by friction, being preferably provided with a friction spring for that purpose. The contacts at 45, as well as those at 44, are preferably of a sliding character, as between clips and a blade, so that an appreciable movement of the lever, in each instance, is necessary to open them.

Immediately upon the opening of contact 45, the magnets 25, 26, are de-energized, the pinions 21, 22, are slipped into engagement with the racks by the action of springs 24, and the forward motions of the traversing members begin again and continue through another time interval as previously explained.

In Fig. 3, the flexible measuring element 12 is attached to traversing member 11 at point 13, passes over a small roller 15, and is wound about a drum 14 carried by traversing member 10. The drum 14 is secured on a shaft 64 which turns in suitable bearings. A spiral spring 65, interacting between the shaft 64 and the member 10, tends to wind the flexible element 12 upon the drum, and serves to keep the flexible element taut.

The maximum interval demand for apparent power is registered by a non-return pointer 66. A circular scale 67, preferably calibrated in kilovolt-amperes, is fixed upon the traversing member 10. The pointer 66 turns upon a suitable friction hub on the member 10. The shaft 64 carries an arm 68 having a pin 69 adapted to engage the pointer 66. The pointer is turned by pin 69 to a position corresponding to the maximum angular displacement of the arm 68, and remains in that position when the arm 68 is retracted.

It is obvious that the maximum interval demand for effective power can be registered by a non-return slidable pointer, 81, arranged to slide on a stationary rod or track 82, in response to a pusher element 83, carried on the traversing member 10.

For service where it is desired to have a record of all the separate interval demands, I add a printing wheel, record sheet and means for impressing the records, as now to be explained. The printing wheel 70 is mounted on a shaft 64, to rotate with the drum 14. The record sheet or chart 18 is carried upon rollers 72, 73, of usual construction, propelled by the clock or constant-speed motor 51, through shaft 74 and gears 75, 76. Beneath the record sheet, and directly under the path of lateral travel of the type wheel 70, is a stamping platen or hammer 77. This forms an extension of the lever 46, to which it is secured by a more flexible element or portion 78. When the lever 46 is released by the cam wheel 50, the lever strikes a stop 79, bringing it abruptly to rest; but the portion 78 bends sufficiently to permit the platen 77, by virtue of its momentum, to strike a blow against the record sheet and type wheel. Carbon paper is ordinarily used to make the visible impression. Simultaneously with the striking of this blow of the platen against the type wheel, the magnets 25, 26, are energized through the contactor 44; by the time the impression has been made on the chart, the pinions 21, 22, are clearing the edges of the racks 19, 20; and immediately the traversing members return to zero position in the manner previously explained. The flexible element 12 is rewound upon the circular carrier 14 by the action of spring 65.

During each time interval the clock 51 advances the chart 18 a sufficient distance to present a fresh surface for the next record.

Obviously, the records of successive interval demands for effective power may be printed in the form of a dot or short line either by the printing wheel itself, or by a type fixed on the traversing member 10 adjacent to the printing wheel.

The constructions herein shown are to be understood as illustrative only and not as defining the limits of the invention.

I claim:

1. The method of measuring time-interval demand for apparent power which comprises: moving an element from a given origin of motion in a first straight line with a velocity proportional to one of the components of apparent power; moving a point from said origin in a second straight line substantially at right angles to said first line with a velocity proportional to the other component of apparent power; rotating said element in proportion to its distance from said point; stopping said motions at the expiration of the predetermined time interval; and denoting the interval demand by the degree of rotation of said element.

2. The method of measuring and denoting in one distinctive reference the apparent and effective power demands in a predetermined time interval, by: giving rectilinear motion to a point from a given origin in proportion to reactive power; transporting a rotative element from said origin in a straight line at right angles to said rectilinear motion in proportion to effective power; rotating said rotative element in proportion to its distance from said moving point; and, at the expiration of the time interval, denoting the aforesaid interval demands respectively by the degree of rotation of said rotative element, and its distance from said origin.

3. Means for measuring and denoting the magnitude of a vector difference comprising: a rotatable circular carrier; a flexible element adapted at one end to cause rotation of said carrier and having the other end free; means for transporting said carrier from a given origin in proportion to a first vector quantity; and means for moving the free end of said flexible element, from said origin, in proportion to a second vector quantity; whereby to denote said first and second quantities by the directions and distances of said carrier and said free end from said origin, and the magnitude of their vector difference by the amount of rotation of said carrier.

4. A first traversing element movable along a first straight line from a given starting point; a second traversing element movable from said starting point along a second straight line; a flexible measuring element responsive to said traversing elements; means for keeping said flexible measuring element taut in the plane common to said straight lines; and a rotative element on one of said traversing elements responsive to said flexible measuring element.

5. In an instrument of the class described, the combination of: first and second traversing elements constrained to recurrent rectilinear motions in a common plane in paths substantially at right angles; a rotative element mounted on one of said traversing elements, to travel in a straight line therewith; and a flexible measuring element attached to the other traversing element and adapted to produce rotation of said rotative element.

6. In an instrument of the class described, in combination with two traversing elements constrained to rectilinear motions in divergent paths; a flexible measuring element; and a printing wheel subject to translation in response to one of said traversing elements and subject to rotation in response to said flexible measuring element.

7. A spring-controlled winding element carried by one of two straight-line traversing elements and adapted to imprint a record of the resultant of separate movements of said two traversing elements.

8. A printing wheel carried upon a first straight-line traversing member and rotatively responsive to a flexible measuring element in operative relation with a second traversing member.

9. In a measuring instrument the combination of: a flexible measuring element responsive at one end to a first quantity; and a circular printing element rotative in response to said flexible measuring element while subject to straight-line traversing movements in response to a second quantity.

10. In an instrument for recording successive time-interval demands for apparent power, the combination of: first and second traversing members constrained to straight-line paths at right angles; a flexible measuring element having one end responsive to the first traversing member; a rotative printing element carried by the second traversing member and rotatively responsive to said flexible measuring element; and a recording chart in operative relation with said traversing members and said printing element.

11. In an apparatus for recording simultaneous interval demands for apparent power and effective power: a pair of traversing members movable in divergent rectilinear paths in a common plane; a winding element rotatively mounted on one of said traversing members and thereby subjected to movements of translation; a flexible measuring element movable in said plane in response to said traversing members and adapted to turn said winding element; a record sheet movable crosswise of the path of translation of said winding element; and means for making an imprint on said record sheet at the expiration of each time interval whereby to record the degree of angular deflection and the extent of linear traverse of said winding element.

12. The combination of: a traversing member; a rotative element carried by said traversing member; a movable chart having a longitudinal reference line; and printing means adapted to print upon said chart a mark denoting the degree of rotation of said rotative element, at a distance from said reference line denoting the extent of traverse of said traversing member.

13. In an instrument of the class described, the combination of: a pair of traversing elements; a flexible measuring element; a rotative element on one of said traversing elements; traversing means adapted recurrently to advance said traversing elements; restoring means adapted to retract said traversing elements; timing means; a movable record sheet; and a printing wheel responsive to said flexible measuring element in operative relation with said record sheet and said timing means.

14. In an instrument of the class described, in conjunction with a meter, a timing device and a traversing member: a wheel responsive to said meter; a shaft secured to said wheel; a pinion slidably mounted on said shaft; a rack on said traversing member adapted to mesh with said pinion; a spring adapted to slide said pinion inwardly on said shaft to engage with said rack; and means responsive to said timing device to slide said pinion outwardly on said shaft to disengage said rack.

15. In conjunction with a pair of meters and first and second traversing members: racks on said traversing members; pinions responsive to said meters and adapted to recurrently engage said racks; a timing means; means for disengaging said pinions from said racks in response to said timing means; means for insuring complete retraction of the first traversing member in advance of the second traversing member; and means responsive to the second traversing member for engaging said pinions with said racks.

16. In combination: a timing mechanism; a printing element; a pair of traversing members having racks; pinions adapted to recurrently engage with said racks; a recording chart; a movable element responsive to the timing mechanism and cooperative with said printing element to impress records upon said chart; means responsive to said movable element to disengage said pinions from said racks; and means responsive to the traversing members to engage said pinions with said racks.

17. In combination with a timing mechanism and a pair of traversing members: forwarding means, for advancing said traversing members; electrical means for disengaging said forwarding means; a movable element responsive to the timing mechanism; a first electrical contact device responsive to said movable element and in circuit with said electrical means; a second electrical contact device in circuit with said electrical means; and means responsive to said movable element to close said second contact device, and responsive to one of said traversing members to open said second contact device.

18. The combination of: first and second traversing members; a detent adapted to arrest the retractive movement of the first traversing member; a projecting element on said first traversing member adapted to engage said detent; and means on said second traversing member adapted to shift said detent out of the path of travel of said projecting element; whereby to insure complete retraction of said second traversing member before the retraction of said first traversing member can be completed.

ALEXANDER DAWES DU BOIS.